US012697721B2

(12) United States Patent
Rueb et al.

(10) Patent No.: US 12,697,721 B2
(45) Date of Patent: Aug. 4, 2026

(54) HANDLING/COMPENSATING DEVICE COMPRISING A SERIAL SPRING ARRANGEMENT AND OPTIONAL DIFFERENT SPRING STIFFNESSES

(71) Applicant: Robert Bosch GmbH, Stuttgart (DE)

(72) Inventors: Andreas Rueb, Tamm (DE); Efim Kuhn, Grettstadt (DE); Michael Danzberger, Zeilitzheim (DE); Peter Schlegel, Obernzenn (DE); Sebastian Siedler, Escherndorf (DE)

(73) Assignee: Robert Bosch GmbH, Stuttgart (DE)

( * ) Notice: Subject to any disclaimer, the term of this patent is extended or adjusted under 35 U.S.C. 154(b) by 726 days.

(21) Appl. No.: 18/317,230

(22) Filed: May 15, 2023

(65) Prior Publication Data

US 2023/0364788 A1 Nov. 16, 2023

(30) Foreign Application Priority Data

May 16, 2022 (DE) .................... 10 2022 204 759.1

(51) Int. Cl.
*B25J 9/16* (2006.01)
*B25J 15/10* (2006.01)

(52) U.S. Cl.
CPC ............. *B25J 9/1641* (2013.01); *B25J 15/10* (2013.01)

(58) Field of Classification Search
CPC .... B25J 9/1641; B25J 9/1628; B25J 17/0208; B25J 17/0225; B25J 17/0233
USPC ...................................................... 294/119.1
See application file for complete search history.

(56) References Cited

U.S. PATENT DOCUMENTS

| | | | | |
|---|---|---|---|---|
| 4,759,686 A | * | 7/1988 | Kirst ................... | B25J 15/0491 414/744.8 |
| 4,815,780 A | * | 3/1989 | Obrist ..................... | B25J 15/04 294/86.4 |
| 4,863,206 A | * | 9/1989 | Kaufmann .......... | B25J 17/0208 901/29 |
| 4,954,005 A | * | 9/1990 | Knasel ................. | B25J 19/063 414/730 |

(Continued)

FOREIGN PATENT DOCUMENTS

| | | |
|---|---|---|
| DE | 10 2015 214 003 A1 | 1/2017 |
| DE | 10 2015 219 332 A1 | 4/2017 |
| DE | 10 2021 205 856 A1 | 12/2022 |

*Primary Examiner* — Paul T Chin
(74) *Attorney, Agent, or Firm* — Maginot, Moore & Beck LLP

(57) ABSTRACT

A compensating device includes a sleeve-shaped compensating device housing which includes an end portion which faces a manipulator and has a manipulator attachment point and, on an opposite end portion, an end effector attachment point configured to rotate and be displaced relative to the housing. A first spring assembly disposed in the region of the manipulator attachment point is configured to apply pretension along a longitudinal direction of the housing translationally in a direction of a Z-axis to the effector attachment point, a second spring assembly disposed in series to the first spring assembly is configured to apply pretension rotationally about an X-axis and a Y-axis to the effector attachment point, and a third spring assembly is disposed in series to the second spring assembly and is configured to apply pretension translationally along the X-axis and the Y-axis direction and rotationally about the Z-axis to the effector attachment point.

13 Claims, 3 Drawing Sheets

(56) References Cited

U.S. PATENT DOCUMENTS

| | | | | |
|---|---|---|---|---|
| 8,794,418 | B1 * | 8/2014 | Norton ................. | B25J 17/0208 |
| | | | | 901/29 |
| 10,668,631 | B2 * | 6/2020 | Rueb .................... | B25J 17/0225 |
| 10,710,218 | B2 * | 7/2020 | Sato ..................... | B23Q 1/0063 |
| 11,916,465 | B2 * | 2/2024 | Danzberger ............. | H02K 7/14 |
| 12,205,427 | B2 * | 1/2025 | Kuhn ................. | G07C 9/00944 |
| 2018/0283842 | A1 * | 10/2018 | Rueb ..................... | G01B 7/012 |
| 2021/0138653 | A1 * | 5/2021 | Loulavi ................. | B25J 9/0096 |
| 2022/0395982 | A1 * | 12/2022 | Rueb ..................... | B25J 13/088 |

* cited by examiner

Fig. 3

HANDLING/COMPENSATING DEVICE COMPRISING A SERIAL SPRING ARRANGEMENT AND OPTIONAL DIFFERENT SPRING STIFFNESSES

This application claims priority under 35 U.S.C. § 119 to patent application no. 10 2022 204 759.1, filed on May 16, 2022 in Germany, the disclosure of which is incorporated herein by reference in its entirety.

The present disclosure relates to a compensating device for a handling device, for example on a robot. The compensating device comprises a first interface portion for a manipulator and a second interface portion for an end effector, so that the compensating device can be disposed between the manipulator and the end effector to compensate positioning inaccuracies between a manipulator and an end effector.

BACKGROUND

In automation technology, robots are widely used for various types of workpiece handling operations. For instance, the handling operations include gripping, moving and positioning workpieces with very high degree of positioning accuracy. Depending on the application, malfunctions can occur when picking up, positioning or joining, for example, due to an unknown or inaccurate positioning of the workpiece or one that is difficult for the end effector to reach. All kinds of compensating devices which can be disposed between the manipulator and the end effector of the robot are used to compensate such malfunctions.

The task of such compensating devices is to enable relative displacements between the end effector, for example a gripper, and the manipulator of the robot, by means of which an unfavorable position tolerance between the manipulator and the workpiece can be compensated by a relative displacement of the gripper within a defined range. Such compensating devices consequently reduce the tolerance requirements on the positioning of the workpiece and the handling operations carried out by the robot become more robust against positioning inaccuracies.

DE 10 2015 214 003 A1 is the closest prior art in relation to the present disclosure and discloses an assembly compensating device which can likewise be disposed between a manipulator and an end effector. Generally speaking, the assembly compensating device disclosed in DE 10 2015 214 003 A1 consists of two joint partners, wherein the first joint partner comprises a first interface portion to the manipulator and the second joint partner comprises a second interface portion to the end effector. One of the joint partners comprises a ball portion, while the other joint partner comprises a conical receptacle for the ball portion. In addition, one of the two joint partners is mounted such that it can be displaced in Z-direction by a spring. The two joint partners jointly form a ball plunge joint that enables three translational and three rotational degrees of freedom of movement, as a result of which the compensating device can carry out a tolerance compensation in any spatial direction.

The structure disclosed in DE 10 2015 214 003 A1, although compact, comprises only one spring per ball plunge joint and thus also has only one spring stiffness characteristic for all degrees of freedom of movement. This results in the disadvantage that, in all spatial directions, the ball plunge joint is displaceable with the same spring stiffness or sensitivity. Especially in the case of very specific and complex handling operations such as picking up, positioning or joining, however, it is often necessary for a compensating device to have different spring stiffness characteristics in different spatial directions and to be less easily displaceable in certain spatial directions than in other spatial directions. In other words, some requirements necessitate the use of compensating devices that are, for example, more easily displaceable in a certain preferred direction and comparatively difficult to displace in other spatial directions that are not preferred directions.

Specific handling tasks of an end effector may furthermore require that certain degrees of freedom of the compensating device be blocked, while at the same time still enabling spring travel with a specific spring stiffness for the remaining non-blocked degrees of freedom in order to allow a displaceable spring travel, i.e., compensating mechanism between end effector and manipulator, in the directions of movement relevant to the specific handling.

The prior art therefore has the disadvantage that the ball plunge joint cannot be specifically set to certain preferred directions with different spring stiffness characteristics, and that selective blocking of degrees of freedom while maintaining spring travel for the remaining directions of movement cannot be enabled.

A further disadvantage of DE 10 2015 214 003 A1 is that the relative displacements between the manipulator and the end effector made possible by the compensating device used here are not measured. This makes the determination of the final position of the end effector and its positions in the space much more difficult.

Based on the above-described prior art and its disadvantages, the underlying technical object of the disclosure is to provide a compensating device which can be disposed between a manipulator and an effector or end effector and which is configured such that the compensating device can have different spring stiffness characteristics for different degrees of freedom of movement, so that a displacement of the compensating device in certain spatial directions can take place more easily than in other spatial directions.

All in all, it should be possible to assemble such a compensating device in a modular manner with as little effort as possible and also permit simple replacement or exchange of the spring assemblies used for the compensation directions.

SUMMARY

The technical object is achieved by a modular compensating device comprising a plurality of spring assemblies according to the disclosure. Advantageous further developments are the subject matter of the disclosure.

According to a first aspect of the disclosure, the compensating device for compensating positioning inaccuracies is disposed between a manipulator and an effector or end effector and comprises a preferably sleeve-shaped compensating device housing having an end portion which faces the manipulator and has a manipulator attachment point and, on an opposite end portion, an end effector attachment point which can be rotated and displaced relative to the housing. The compensating device further comprises a first spring assembly which is disposed in the region of the manipulator attachment point and applies pretension along the longitudinal direction of the housing translationally in the direction of a Z-axis to the rotatable and displaceable end effector attachment point, a second spring assembly which is disposed in series to the first and applies pretension rotationally about an X- and a Y-axis to the end effector attachment point and a third spring assembly which is disposed in series to the second and applies pretension translationally in the X- and the Y-direction and rotationally about the Z-axis to the end effector attachment point.

According to a second aspect of the disclosure, the compensating device can comprise a preferably sleeve-shaped piston, which is accommodated in the sleeve-shaped compensating device housing and is supported in a longitudinally displaceable manner relative to the compensating device housing via the first spring assembly and its spring seat, a wobble plate, which is pivotably mounted in or on the piston and is pretensioned by means of the second spring assembly which is supported against the spring seat into a design position which is preferably oriented perpendicular to the spring seat, and the end effector attachment point, which is mounted on the wobble plate such that it can rotate and also be displaced along said plate and is supported and preferably pretensioned relative to the wobble plate via the third spring assembly.

A particularly advantageous feature of the serially disposed spring assemblies is that they can thus be accommodated in, so to speak, individual logical separation planes in the compensating device housing, and a respective specific spring stiffness can be used for pretensioning in certain degrees of freedom, e.g., the first spring assembly ensures a specific pretensioning of the end effector attachment point in the translational Z-direction. The compensating behavior of the compensating device in the respective degrees of freedom can thus be influenced differently, which would not be possible in a compensating device with only one spring for pretensioning.

Accommodating the individual spring assemblies in their own separation planes, for example the first spring assembly between the end portion of the compensating device housing facing the manipulator and the spring seat, furthermore creates functional blocks, as it were. These functional blocks each take on specific kinematics, in other words, these functional blocks are configured for pretensioning the end effector attachment point in specific degrees of freedom. This makes it possible to, as it were, create a serial building-block approach from the individual functional blocks disposed relative to one another, with which various smaller kinematic units in the form of functional blocks can be fit together to a complex serial kinematic unit. This then makes it possible to react individually to changes in requirements in specific kinematic sections by replacing functional blocks without having to create completely new, complex kinematics.

The serial concept of the functional blocks moreover reduces the complexity of the compensating device as a whole and simplifies assembly and maintenance. Since the partitioning into functional blocks allows for smaller, less complex modules, as it were, more cost-effective production and assembly of the components is possible as well.

According to a third aspect of the disclosure, the compensating device can be configured such that the inner wall of the piston is indented in a semicircular manner in relation to its outer side which extends parallel to the longitudinal axis of the compensating device housing and, with its wobble plate edge which bulges in a part-circular manner complementary to the piston inner wall, the wobble plate accommodated in the piston is pivotably mounted relative to the piston, wherein the second spring assembly is supported between the spring seat and the upper side of the wobble plate facing the spring seat and applies pretension.

A particularly advantageous feature of the semicircular indented contour of the inner wall and the part-circular bulged contour of the wobble plate edge is that, already because of the geometry of the two contours, a translational displacement of the center point of the wobble plate in Z-direction is not possible, which results in a particularly robust structure. Despite the fixed position of the center point of the wobble plate in the translational Z-direction, pivoting about the X- and Y-rotational axes of the wobble plate is possible. Therefore, in terms of their kinematics, the arrangement of the wobble plate and the piston resemble a joint in the socket.

According to a fourth aspect of the disclosure, a T-shaped anchor comprising a head portion and a pin portion can be accommodated in the compensating device in the end effector attachment point. The pin portion projects from the end effector attachment point and is connected to the wobble plate in an axially secured manner and the end effector attachment point is mounted on the anchor such that it can be transversely displaced and rotate about the Z-axis relative to the wobble plate.

According to a fifth aspect of the disclosure, the third spring assembly of the compensating device can comprise at least two springs, each of which is supported in a recess, preferably a blind hole, in the wobble plate and pretensions a ball which is disposed in series and is partially guided in the recess and with its portion that projects from the recess engages in a conical recess in the end effector attachment point.

If a force now acts on the end effector attachment point from the outside, the end effector attachment point is displaced and the edge portions of the conical recess displace the balls further and further in the direction of the springs. If the external force now decreases or disappears completely, the springs, which are compressed and under increased pretension, push the balls along the inclined edge portions back to the lowest point of the conical recesses. The springs in combination with the balls mounted in the conical recesses thus advantageously exert a self-centering effect on the end effector attachment point.

According to a sixth aspect of the disclosure, each spring assembly of the compensating device can have a specific spring stiffness and comprise at least two springs, preferably helical springs.

This results in the advantage that the compensating device can be pretensioned in different degrees of freedom with different spring stiffness characteristics and can therefore react to different directions of action of force with different compensating behaviors. In other words, preferred compensation directions can be created that allow a compensating movement of the compensating device in certain directions with a lesser application of force than when force is applied to the compensating device from another, not preferred, direction.

According to a seventh aspect of the disclosure, the compensating device can comprise a locking device mounted on the spring seat for blocking degrees of freedom of the end effector attachment point, preferably a bow-shaped latching device comprising at least two legs which extend in the direction of the end effector attachment point and the latching device is displaceable along the longitudinal axis of the compensating device housing and, in a first locking position, blocks pivoting of the wobble plate along the X- and the Y-axis in that the legs of the latching device engage in respective engagement openings of the wobble plate.

This has the advantage that the wobble plate can be locked for certain handling tasks in which pivoting about the X- and the Y-axis would be disadvantageous.

According to an eighth aspect of the disclosure, the latching device of the compensating device can be moved into a second locking position which acts in series with the first locking position and in which the latching device blocks translational displacement in X- and Y-direction and rotation about the Z-axis of the end effector attachment point, in that the legs of the latching device enter into the recesses through the wobble plate via the engagement openings, reach through or past the springs mounted therein and press on the balls mounted in the conical recesses and block them when the latching device is supported on the spring seat in the second locking position or, when the latching device in the second locking position is not supported on the spring seat but is instead supported on the housing, the latching device additionally blocks translational displacement in Z-direction. The locking or latching device can alternatively also be implemented as disclosed in DE 10 2021 205 856 A1 and press on and fix in position the balls mounted in the recesses/ball seats by means of actuating elements that can be displaced with an electric motor.

This results in the advantage that, in addition to locking the wobble plate, the relative movement between the wobble plate and the end effector attachment point can deliberately be blocked as well, i.e., a displacement of the end effector attachment point in the translational X- and Y-direction and a rotation about the Z-axis is specifically blocked. The compensating device can thus be switched over for handling tasks which require only one compensating movement in Z-direction and, after completion of this specific handling task, released again in all compensation directions.

According to a ninth aspect of the disclosure, the compensating device can comprise a sensor device with a plurality of sensor units for outputting sensor signals which comprise at least one sensor and a corresponding target area and at least one sensor and an opposite target area are respectively disposed between the end portion facing the manipulator and the spring guide, between the spring guide and the wobble plate and between the wobble plate and the end effector attachment point, and the sensors are each configured for, in particular contactless, detection of the target area, and the compensating device accordingly comprises an evaluation device which is configured to determine a relative position in three translational degrees of freedom and in three rotational degrees of freedom between the sensors and the target areas.

The sensor device provides the advantage that the compensating movements of the respective functional blocks, i.e., between the end portion facing the manipulator and the spring guide, between the spring guide and the wobble plate and between the wobble plate and the end effector attachment point, can be measured and passed on to the control unit of a handling device, for example an articulated arm robot. Positioning inaccuracies can thus not only be compensated by the compensating device, but can also be perceived for the handling device, which in turn enables the handling device to provide corrective control of the manipulator with the compensating device connected to it and the end effector connected to it and to reduce the positioning inaccuracy.

According to a tenth aspect of the disclosure, the evaluation device of the compensating device can determine the degrees of freedom by means of a calibration or by means of an analytical or numerical calculation.

BRIEF DESCRIPTION OF THE DRAWINGS

The present disclosure will be explained in more detail in the following using preferred embodiments with reference to the accompanying figures.

FIG. 3 is a cross-sectional view of a compensating device;

Embodiment examples of the present disclosure will be described in the following on the basis of the accompanying figures. The same elements are provided with the same reference signs. The features of the individual embodiment examples are interchangeable.

DETAILED DESCRIPTION

Figure 1:
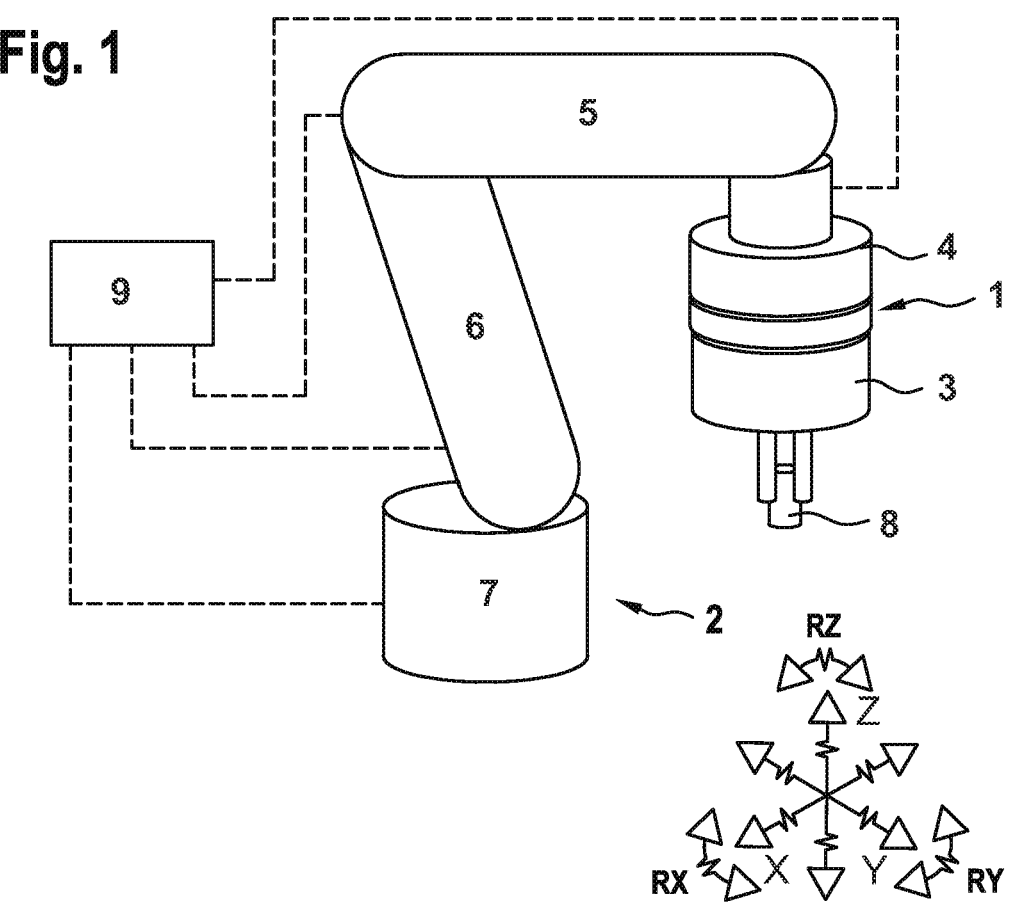
FIG. 1 is a perspective view of an articulated arm robot comprising a compensating device.

FIG. 1 shows the arrangement of the compensating device 1 according to the disclosure on a handling device 2. The compensating device 1 is disposed between an end effector 3 and a manipulator 4. In FIG. 1, the handling device 2 represents an articulated arm robot 2, on which the manipulator 4 is attached to a robot foot 7 via two articulated arms 5, 6. Such articulated arm robots 2 are sufficiently known from the prior art, so that a detailed explanation is not necessary. The articulated arm robot 2 shown in FIG. 1 can be used for so-called pick-and-place applications, for example, in which the articulated arm robot 2 grabs objects 8 by means of its end effector 3, here a gripper 3, and selectively places them in another location. The articulated arm robot 2 and the gripper 3 connected to it are controlled via a control unit 9, which is in signal and data connection (indicated by the dashed lines) with the respective actuating elements and measuring devices of the articulated arm robot 2 and the end effector 3.

Figures 2A, 2B:
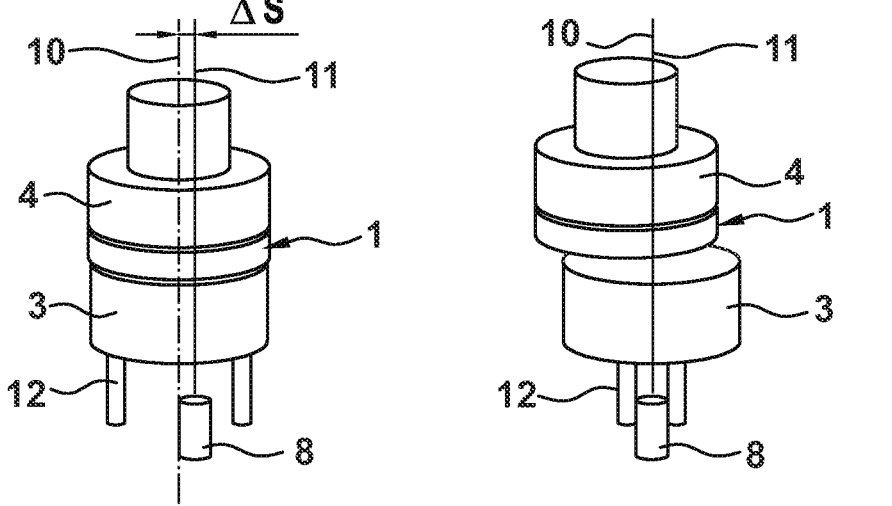
FIG. 2a is a perspective view of an end effector being positioned relative to an object.
FIG. 2b is a perspective view of the end effector which, with the aid of a compensating device, has compensated a positioning inaccuracy of end effector to object.

As shown in FIG. 2a, inaccuracies between the positioning of the manipulator 4 and the end effector 3 connected to it and the object 8 to be grabbed can occur during handling operations or pick-and-place tasks. As can be seen from FIG. 2a, the gripper center axis 10 is not aligned with the object center axis 11, or there is a difference AS between the target and the actual position of the object 8, so that a gripping operation of the object 8 carried out by the gripper 3 could fail. In order to be able to compensate such position tolerances as shown in FIG. 2a, which can lead to damaging collisions between the end effector 3 and the surroundings, for example, or to the failure of gripping operations, it is necessary to enable compensating relative displacements between the end effector 3 and the manipulator 4 which compensate said position tolerances.

The compensating device 1 according to the disclosure is therefore used to allow a relative movement between the manipulator 4 and the gripper 3, so that the gripper 3 can be adjusted or pulled into displacement position automatically via the at least partially abutting gripper jaws 12, so that the gripper center axis 10 and the object center axis 11 are aligned, as shown in FIG. 2b, and the object 8 can be gripped securely.

Figure 3:
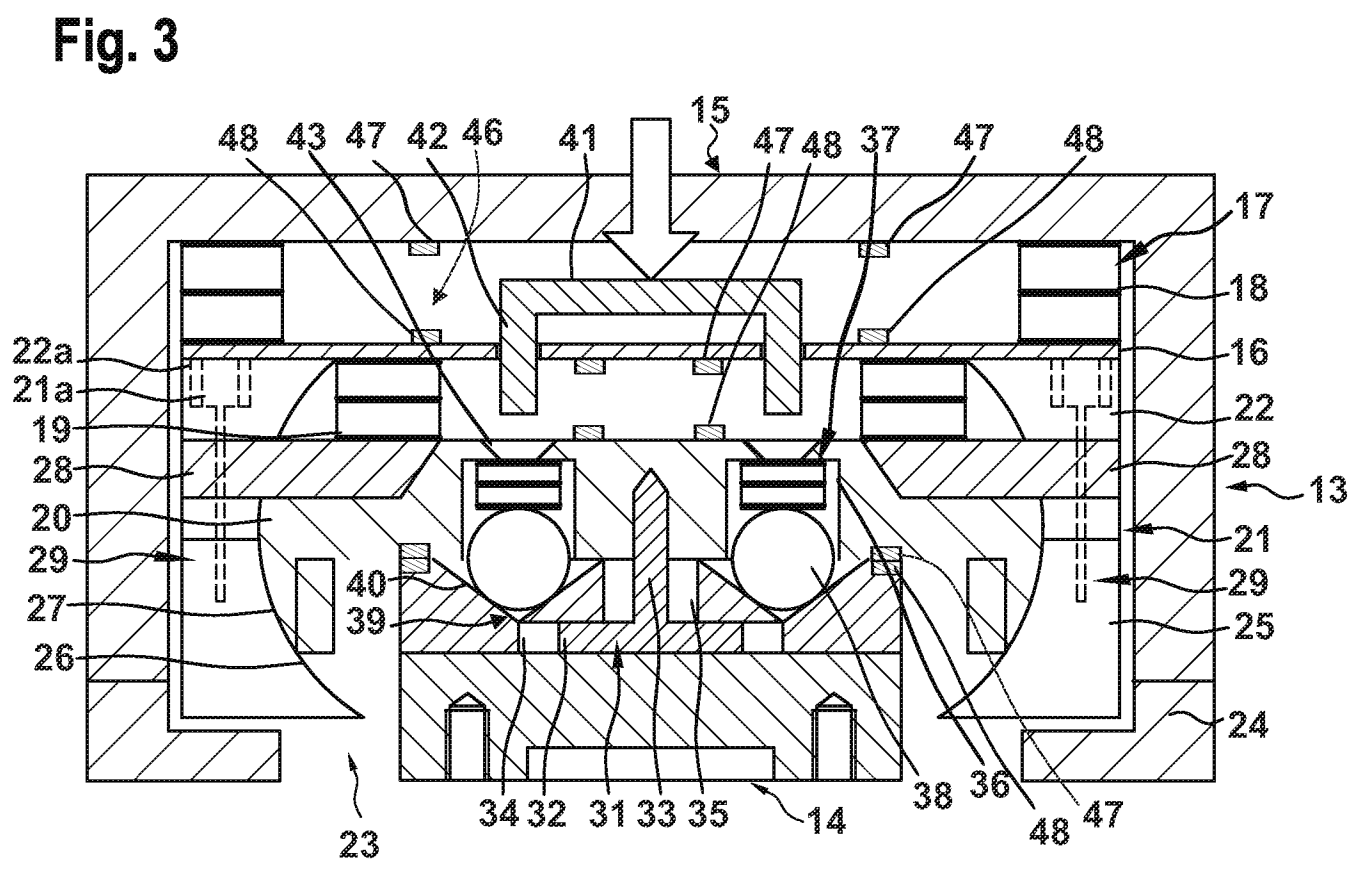

The compensating device 1 according to the disclosure is configured such that an end effector attachment point 14 shown in FIG. 3, which is provided on the side of the compensating device housing 13 facing the end effector 3, can be tilted, rotated, and displaced relative to the compensating device housing 13. In other words, the end effector attachment point 14 allows the attached gripper 3 to carry out compensation operations relative to the compensating device housing 13 and the manipulator 4 in the translational X-, Y- and Z-directions and rotations about the X-, Y- and Z-axes.

The structure and mode of operation of the compensating device 1 will be explained in more detail in the following with reference to FIG. 3. FIG. 3 shows a preferably sleeve-shaped compensating device housing 13, on the end portion of which facing a manipulator, on the upper side facing the manipulator, a manipulator attachment point 15 used for connection to a manipulator 4 on a handling device 2 is located. The manipulator attachment point 15 is not further specified in FIG. 3, but can be implemented as a standard flange connection, for example as a screw flange. In the interior of the compensating device housing 13, a first spring assembly 17 comprising at least two helical springs 18 is disposed between the end portion 14 facing the manipulator and a preferably disc-shaped spring seat 16.

The first spring assembly 17 pretensions the spring seat 16 guided in the compensating device housing 13 along the longitudinal axis of the compensating device housing 13 in Z-direction. The spring seat 16 functions here as the first separation plane between the first spring assembly 17 and the components disposed below it in the direction of the end effector attachment point 14. The end portion facing the manipulator, the first spring assembly 17 and the spring seat 16 represent a first functional block which enables pretensioning in the Z-direction of the end effector attachment point 14.

A second spring assembly 19, which is supported on both the spring seat 16 and a wobble plate 20, is disposed on the side of the spring seat 16 facing away from the first spring assembly 17. The wobble plate 20, meanwhile, is accommodated in a preferably sleeve-shaped piston 21. With the upper portion 22 of its wall, the piston 21 is supported on the spring seat 16 and extends in the direction of the opening 23 of the end effector attachment point 14 to a retaining element 24, preferably a retaining ring 24, which projects at right angles from the compensating device housing 13 to the housing interior and thus serves as a stop for the lower portion 25 of the piston wall. The connection or fastening of the retaining element 24 to the compensating device housing 13 is not shown here in more detail, but can be configured using standard connecting elements, preferably releasable connecting elements, such as screws, pins, snap hooks or clips.

The inner wall 26 facing the wobble plate 20 is furthermore indented in a semicircular manner in relation to the outer wall which extends parallel to the longitudinal axis of the compensating device housing 13 and encloses a wobble plate edge 27 which bulges in a complementary manner to it. The complementary part-circular contours of the inner wall 26 of the piston 21 and the wobble plate edge 27 allow the wobble plate 20 to be pivoted about the X- and the Y-axis in the piston 21, similar to a joint in a socket. At the same time, the form fit of the complementary contours of the wobble plate edge 27 and the inner wall 26 of the piston 21 prevents displacement of the midpoint of the wobble plate 20 in the translational Z-direction.

As shown in FIG. 3, the wobble plate 20 can moreover comprise at least two guide elements 28, preferably guide pins 28, which project laterally beyond the wobble plate edge 27 and engage in an intermediate space 29 along the longitudinal axis of the piston 21 and thereby secure the wobble plate against rotation about the Z-axis, so that only pivoting about the X- and the Y-axis is possible. The intermediate space 29 along the longitudinal axis can be configured as a groove which is open to the inside of the piston or as a notch, or the piston 21 consists of two piston halves, as shown in the illustrated embodiment in FIG. 3, wherein the bisection runs along the longitudinal axis of the compensating device housing 13 and the guide pins engage in the intermediate space 29 between the oppositely disposed piston halves. Thus, pivoting of the wobble plate 20 about the X- and the Y-axis is possible over almost the entire extent of the piston 21 in Z-direction.

It should be noted here that the spring seat 16, the second spring assembly 19 and the wobble plate 20 accommodated in the piston 21 represent a second functional block, in which the second spring assembly 19 pretensions the wobble plate 21 in a zero position, i.e., a starting position to which the wobble plate 20 returns in a self-adjusting manner without an application of force from the outside. Starting from its zero position or starting position, the wobble plate 20 can be rotationally pivoted about the X- and the Y-axis. The wobble plate 20 additionally functions as a second logical separation plane between the second spring assembly 19 and the components disposed in the direction of the end effector attachment point 14.

The end effector attachment point 14 is furthermore, preferably directly, disposed on the side of the wobble plate 20 facing away from the second spring assembly 19. The end effector attachment point 14 is connected to the wobble plate 20 via a T-shaped anchor 31, which comprises a head portion 32 and a pin portion 33. The head portion 32 here is preferably disc-shaped and is accommodated in a preferably circular recess 34 in the end effector attachment point 14, which has a larger diameter than the preferably disc-shaped head portion 32.

Furthermore, a preferably cylindrical access 35 facing the wobble plate 20 leads to the recess 34. The access 35 extends substantially perpendicular with respect to the circular recess 34 and the center axes of the access 35 and the recess 34 are aligned with one another, wherein the access 35 has a smaller diameter than the recess 34. The pin portion 33 of the T-shaped anchor 31 extends substantially parallel to the wall of the preferably cylindrical access 35 and has a significantly smaller diameter than said access. The type of connection between the pin portion 33 and the wobble plate 20 is not shown in detail in FIG. 3, but includes all standard, preferably releasable, types of connections, such as a thread/screw connection or a pin connection with a spring-pretensioned latching element, which can be inserted into a bore with a receiving recess for the latching element. Since the diameter of the pin portion 33 is significantly smaller than the diameter of the access 35 and the diameter of the head portion 32 is significantly smaller than the diameter of the recess 34, the T-shaped anchor 31 is accommodated with play in the end effector attachment point and the end effector attachment point is thus mounted such that it is displaceable relative to the wobble plate 20 translationally in X and Y-direction and rotationally about the Z-axis.

The pretensioning in a zero position of the end effector attachment point 14, i.e., a starting position into which the end effector attachment point 14 returns in a self-adjusting manner with respect to the wobble plate 20 without an application of force from the outside will now be described in the following. For this purpose, at least two recesses 36, which are open to the end effector attachment point 14 and in which a third spring assembly 37, in the form of preferably one respective helical spring 18, is accommodated, are configured in the wobble plate 20. In one direction, the helical springs 18 of the third spring assembly 37 are supported on the end face of the recesses 36 and, in the opposite direction, are supported against balls 38 which are partially accommodated and guided in the recesses and pretension them in the direction of the end effector attachment point 14.

A significant portion of the balls 38 projects from the recesses 36 of the wobble plate 20 and rests in conical recesses 39 of the end effector attachment point 14. If a force now acts on the end effector attachment point 14 from the outside and it is displaced transversely relative to the wobble plate 20, the conical recesses 39 are displaced along with the end effector attachment point 14, so that the inclined, rising ramp portions 40 of the conical recesses 39 press the balls 38 further and further into the recesses 36 of the wobble plate as the transverse displacement progresses, as a result of which the pretensioning of the helical springs 18 of the third spring assembly increases continuously.

Now, if the action of force from the outside which initially triggered the transverse displacement of the end effector attachment point 14 relative to the wobble plate 20 decreases or disappears, the helical springs 18 which are under increased pretension push the balls 38 back out of the recesses 36, so that they slide along the respective ramp portions 40 of the conical recesses 39 and only end their sliding movement when they are supported by at least two sides in the conical recess 39, so that further sliding of the ball 38 into the conical recess 39 is no longer possible. This compensating sliding movement of the balls 38 along the ramp portions 40 of the conical recesses 39 by the helical spring 18 which is under increased pretension automatically self-adjusts the end effector attachment point 14.

In summary it can be said that, despite its complex function, namely compensating positioning inaccuracies by displacement, pivoting and rotation of the end effector attachment point 14 in all six degrees of freedom, the compensating device 1 is comparatively easy to assemble. This is primarily due to the serial arrangement, but nonetheless separate arrangement, of the first, second and third spring assemblies 17, 19, 37. During assembly, the first spring assembly 17 is initially inserted into the still empty compensating device housing 13, this is followed by the spring seat 16, so to speak as both a separation plate and a guide. The second spring assembly 19 and the piston 21 can then be disposed on the side of the spring seat 16 facing away from the first spring assembly 17.

Another special feature of piston 21 is that, as already mentioned, it consists of an upper portion 22 and a lower portion 25, which represent piston segments that can be separated from one another. For assembly, it is first necessary to insert only the upper piston portion 22, the inner wall of which is indented in the longitudinal direction of the compensating device housing 13 in the shape of a quarter circle relative to the outer side of the upper piston portion 22, in order to then be able to accommodate the wobble plate 20 via its wobble plate edge 27, the configuration of which is part-circular to complement the inner wall 26 of the piston 21. The assembly of the wobble plate 20, third spring assembly 37 and end effector attachment point 14 has ideally already been carried out prior to inserting the wobble plate 20 into the compensating device housing 13 and placing the wobble plate 20 in the upper piston portion 21.

After arranging the wobble plate 20 on the upper piston portion 22, the lower piston portion 25, which likewise has an inner wall in the shape of a quarter circle that bulges relative to the piston outer wall, can now be inserted into the compensating device housing 13. When joined together, the upper portion 22 and the lower portion 25 of the piston 21 form a semicircular, bulged inner wall 26, which enclose the wobble plate edge 27, which is complementarily bulged in a part-circular manner so that it can slide up and down in the semicircular indentation of the inner wall of the piston 21.

To prevent rotation of the upper portion 22 and the lower portion 25 relative to one another, the two portions are secured by at least two plug pins 21*a*, which extend along the longitudinal axis of the wall of the piston 21 and are inserted via a blind hole 22*a* on the end face of the upper portion 22 of the piston. After the wobble plate 20 has been enclosed by the piston 21 in the compensating device housing 13, the assembly of the compensating device 1 can be completed by axially securing the piston 21 via the placement of the retaining ring 24 on the compensating device housing 13.

A latching device 41 of the compensating device 1, which makes it possible to selectively block compensating movements of the end effector attachment point 14 in certain directions, will now be explained in more detail in the following, also with reference to FIG. 3. The latching device 41 is bow-shaped or clip-shaped and is mounted on spring seat 16. The latching device 41 comprises at least two legs 42 which extend in the direction of the end effector attachment point 14 and pass through the spring seat 16. The latching device 41 can be displaced along the longitudinal axis of the compensating device housing 13 and can be adjusted via a, for example pneumatic, hydraulic or electrical, actuator, which is not shown in detail. The locking direction of the latching device 41 is indicated in FIG. 3 by an arrow. In its first position shown in FIG. 3, the latching device 41 is in an unlocking position, in which no directions of movement of the end effector attachment point 14 are blocked.

When the latching device 41 is displaced into its first locking position, the at least two legs 42 of the latching device 41 each engage in engagement openings 43 on the upper side of the wobble plate 20 facing the spring seat 16, so that pivoting of the wobble plate 20 along the X and the Y-axis is blocked.

When the latching device 41 is displaced further in the direction of the end effector attachment point 14, it is brought into a second locking position and the legs 42 pass through the engagement openings 43 and engage through or past the helical springs 18 and press the balls 38 against the conical recesses 39, so that displacement in X and Y-direction and rotation about the Z-axis of the end effector attachment point 14 relative to the wobble plate 20 is blocked. Overall, the second locking position blocks all degrees of freedom except translational displacement in the Z-direction of the end effector attachment point.

Figure 4:
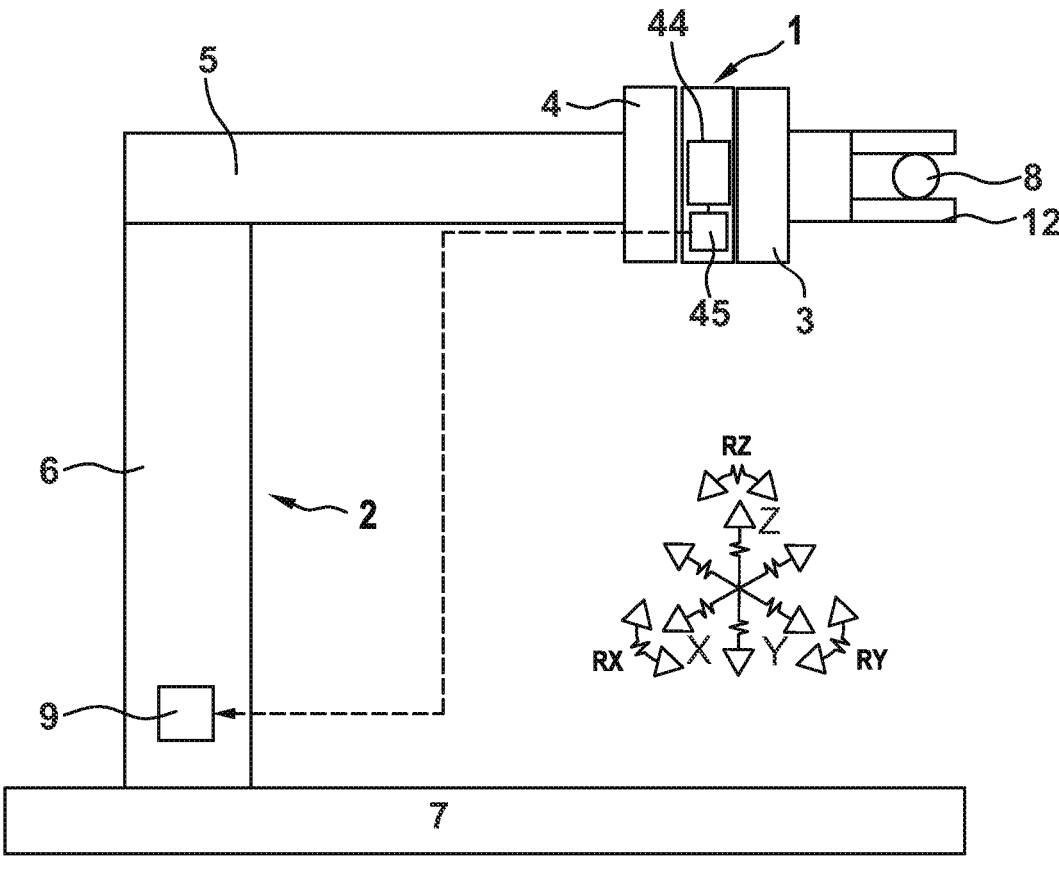
FIG. 4 is a schematic illustration of an articulated arm robot comprising a sensor device and an evaluation device.

FIG. 4 shows another special technical feature of the compensating device 1, which likewise serves to compensate positioning inaccuracies. This is a sensor device 44, which is disposed in the compensating device 1 and is coupled to an evaluation device 45. The sensor device 44 and the evaluation device 45 are shown only schematically in FIG. 4, because in terms of their fundamental mode of operation they belong per se to the general prior art. In combination with the compensating device 1 according to the disclosure, however, they represent a technical further development. Detailed, further descriptions of the range of functions of the sensor device per se are disclosed in DE 10 2015 219 332 A1.

The sensor device 44 comprises a plurality of sensor units 46, shown schematically in FIG. 3, for outputting sensor signals which comprise at least one sensor 47 and a corresponding target area 48 of which at least one sensor 47 and an opposite target area 48 are respectively disposed between the end portion facing the manipulator 4 and the spring seat 16, between the spring seat 16 and the wobble plate 20 and between the wobble plate 20 and the end effector attachment point 14. The sensors 47 are each configured for, in particular contactless, detection of the target area 48. The detection of the target area carried out by the sensor 47 can be implemented using optical, capacitive or inductive measurement principles.

The data which relates to the positioning of the sensor 47 relative to the target area 48 and is acquired by means of the detection is passed in the form of sensor signals from the sensor device 44 to the evaluation device 45, which is configured to determine the respective current relative position in three translational and three rotational degrees of freedom between the sensors 47 and the target areas 48. The evaluation device 45 is preferably configured as a digital data processing device and determines the degrees of freedom by means of a calibration or by means of an analytical or numerical calculation.

In summary it can be said that the combination of the compensating device 1 with a latching device 41 and a sensor device 44 and an evaluation device 45 enables highly precise and at the same time highly flexible handling applications. The respective first, second and third spring assemblies 17, 19, 37 allow a customizable compensating device 1 that can be set to certain preferred directions. Adding the latching device 41, which permits two-stage blocking of different degrees of freedom, then makes it possible to react to changing conditions in the handling environment.

The sensor device 44 together with the evaluation device 45 furthermore makes it possible to precisely determine the relative displacement of the end effector attachment point with respect to the compensating device housing 13, so that the compensation operation carried out by the compensating device 1 can be detected for the control of the handling device 2 and the compensation operation can also be influenced via the control of the handling device 2.

What is claimed is:

1. A compensating device for compensating positioning inaccuracies between a manipulator and an effector comprising:

a sleeve-shaped compensating device housing which includes an end portion which faces the manipulator and has a manipulator attachment point and, on an opposite end portion, an end effector attachment point configured to rotate and be displaced relative to the housing, wherein a first spring assembly is disposed in the region of the manipulator attachment point and is configured to apply pretension along a longitudinal direction of the housing translationally in a direction of a Z-axis to the rotatable and displaceable effector attachment point;

a second spring assembly is disposed in series to the first spring assembly and is configured to apply pretension rotationally about an X-axis and a Y-axis to the effector attachment point; and a third spring assembly is disposed in series to the second spring assembly and is configured to apply pretension translationally along the X-axis and the Y-axis direction and rotationally about the Z-axis to the effector attachment point.

2. The compensating device for compensating positioning inaccuracies according to claim 1, wherein:

a sleeve-shaped piston is accommodated in the sleeve-shaped compensating device housing and is supported in a longitudinally displaceable manner relative to the compensating device housing via the first spring assembly and a spring seat of the sleeve-shaped piston;

a wobble plate is pivotably mounted in or on the sleeve-shaped piston and is pretensioned by the second spring assembly which is supported against the spring seat of the sleeve-shaped piston into a design position which is oriented perpendicular to the spring seat of the sleeve-shaped piston; and the effector attachment point is mounted on the wobble plate such that it can rotate and also be displaced along said plate and is supported relative to the wobble plate via the third spring assembly.

3. The compensating device for compensating positioning inaccuracies according to claim 2, wherein:

an inner wall of the sleeve-shaped piston is indented in a semicircular or dome-shaped manner in relation to its outer side which extends parallel to the longitudinal axis of the compensating device housing;

the wobble plate is pivotably mounted relative to the sleeve-shaped piston with a wobble plate edge which bulges in a part-circular or part-spherical manner complementary to the inner wall of the sleeve-shaped piston;

the second spring assembly is supported between the spring seat and an upper side of the wobble plate facing the spring seat; and guide elements project laterally beyond the wobble plate edge and engage in an intermediate space along the longitudinal axis of the sleeve-shaped piston and thus prevent a rotation of the wobble plate about the Z-axis.

4. The compensating device for compensating positioning inaccuracies according to claim 3, wherein:

a T-shaped anchor comprising a head portion and a pin portion is accommodated in or on the effector attachment point;

the pin portion projects from the effector attachment point and is connected to the wobble plate in an axially secured manner to hold the effector attachment point on the wobble plate; and the effector attachment point is mounted on the T-shaped anchor such that it can be transversely displaced and rotate about the Z-axis relative to the wobble plate.

5. The compensating device for compensating positioning inaccuracies according to claim 4, wherein:

the third spring assembly comprises at least two springs, each of which is supported in a respective recess in the wobble plate and pretensions a ball which is disposed in series and is partially guided in the respective recess toward the effector attachment point and, with a portion that projects from the respective recess, rests in a respective conical recess in the effector attachment point.

6. The compensating device for compensating positioning inaccuracies according to claim 5, wherein:

a bow-shaped locking or latching device comprising at least two legs which extend in the direction of the effector attachment point is mounted on the spring seat and configured to block degrees of freedom of the effector attachment point; and the latching device is held such that it is displaceable along the longitudinal axis of the compensating device housing and, in a first locking position, blocks pivoting of the wobble plate along the X-axis and the Y-axis in that the legs of the latching device engage in respective engagement openings of the wobble plate.

7. The compensating device for compensating positioning inaccuracies according to claim 6, wherein:

the latching device is configured to be moved into a second locking position which acts in series with the first locking position, and in which the latching device blocks translational displacement along the X-axis and the Y-axis and rotation about the Z-axis of the effector attachment point, in that the legs of the latching device enter into the respective recesses through the wobble plate via the respective engagement openings, press through or past the at least two springs of the third spring assembly onto the respective balls mounted in the respective conical recesses and block them (i) when the latching device in the second locking position is supported on the spring seat or, (ii) when the latching device in the second locking position is not supported on the spring seat but is instead supported on the housing, the latching device additionally blocks translational displacement in Z-direction.

8. The compensating device for compensating positioning inaccuracies according to claim 5, wherein the recess is a blind hole.

9. The compensating device for compensating positioning inaccuracies according to claim 3, wherein the guide elements are guide pins.

10. The compensating device for compensating positioning inaccuracies according to claim 2, wherein:

a sensor device with a plurality of sensor units configured to output sensor signals:

each of the plurality of sensor units comprise at least one sensor configured for contactless detection of a corresponding target area;

a first of the plurality of sensor units is disposed between the end portion facing the manipulator (4) and the spring seat (16), a second of the plurality of sensor units is disposed between the spring seat and the wobble plate a third of the plurality of sensor units is disposed and between the wobble plate and the effector attachment point; and an evaluation device is configured to determine a relative position in three translational degrees of freedom and in three rotational degrees of freedom between the sensors and the target areas of the plurality of sensor units.

11. The compensating device for compensating positioning inaccuracies according to claim 10, wherein the evaluation device is configured to determine the degrees of freedom using a calibration and/or using an analytical or numerical calculation.

12. The compensating device for compensating positioning inaccuracies according to claim 1, wherein:

each spring assembly has a respective specific spring stiffness and comprises at least two springs.

13. The compensating device for compensating positioning inaccuracies according to claim 12, wherein:

the at least two springs are helical springs.

* * * * *